TIME DELAY ANTENNA DISCONNECT DURING TUNING
Filed Dec. 10, 1962
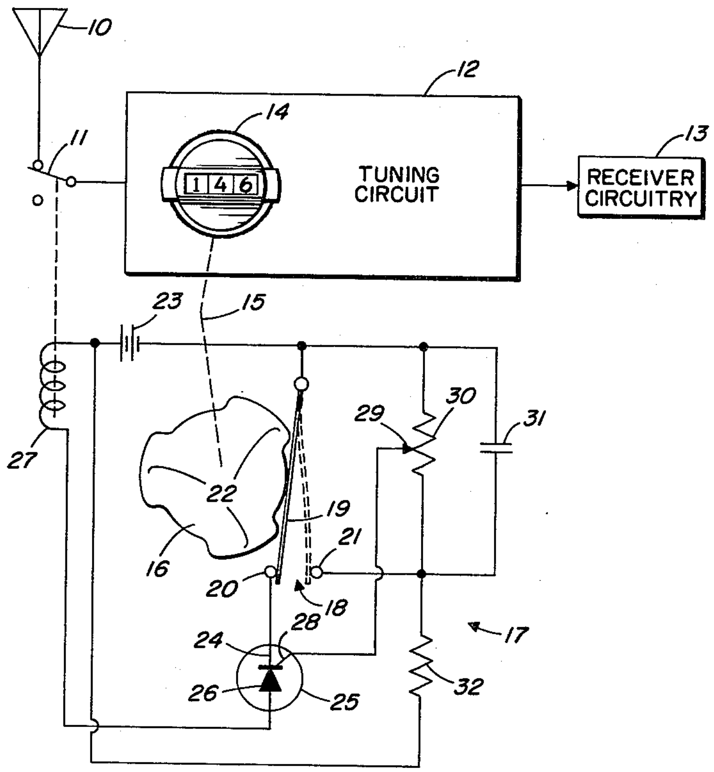
INVENTOR.
Grant G. Myers
BY
Woody and Kintzinger
Attorneys

United States Patent Office 3,188,570
Patented June 8, 1965

3,188,570

TIME DELAY ANTENNA DISCONNECT DURING TUNING

Grant G. Myers, Marion, Iowa, assignor to Collins Radio Company, Cedar Rapids, Iowa, a corporation of Iowa Filed Dec. 10, 1962, Ser. No. 243,268
7 Claims. (Cl. 325—362)

This invention relates in general to circuit overload protective systems, and in particular to an antenna to receiver time delay circuit shutoff relay system that disconnects the antenna input during tuning rotation of turrets by a megacycle control knob.

There are signal overload protective devices, and systems for antenna to receiver input circuit shutoff, that do the job quite satisfactorily in many circuits for some specific systems. However, difficulties may be encountered in protecting against signal overload as a receiver is being tuned from one frequency to another. A receiver may be tuned through a range of frequencies, which contains one or more frequencies, at an excessively high voltage level which may, in some cases, be known by the operator. Such high voltage frequency components may be caused by a high power antenna transmitting at close proximity to the receiving antenna, or by a high power transmitter operating on the same antenna. Such high voltage frequencies may cause undesired tuned circuit switch arcing and/or may cause damage to filter components. Some overload protective devices, designed to operate on selected frequencies, would not be operated and provide protection against all off-frequency signals. For example, it may be possible for a receiver to be tuned through a frequency signal imparting up to 90 volts R.M.S. to the antenna, a signal strength that could result in as much as 900 volts being applied to certain components in a receiver filter before an overload protective on-frequency device would become activated. Obviously, many receiver components would fail at a much lower level than 900 volts.

It is, therefore, a principal object of the invention to provide an antenna to receiver shutoff protective system that disconnects the antenna input during tuning of a receiver.

A further object is to provide automatically activated protective shutoff in an antenna to receiver circuit that is activated by rotation of a tuning knob, and having a time delay in closing the input circuit after the receiver is tuned and rotation of the tuning knob has stopped.

Features of this invention useful in accomplishing the above objects, in a time delay antenna to receiver circuit disconnect activated by tuning of the receiver, includes utilization of a cam drive connected for rotation when a radio tuning knob is being turned, and a single pole double throw switch alternately switched back and forth between a normally closed contact and a second contact by the rotating cam during tuning. The single pole of the switch is connected to one side of a voltage supply. The normally closed contact of the switch is connected to an electrode of a solid state switch having another electrode connected to an overload protective antenna shutoff relay. A third control electrode is connected to the adjustable tap of a potentiometer connected in parallel with a capacitor for voltage control to fire of the solid state switch, and for activation of the antenna shutoff relay to remove protective shutoff. With the cam activated switch moved by the cam to the second contact, the capacitor is shorted out and with the potentiometer tap voltage removed the solid state switch is turned off and the antenna relay is de-activated for antenna to receiver circuit shutoff. Voltage buildup of the potentiometer tap and the control electrode of the solid state switch is dependent upon the charging rate of the capacitor as determined by the time constant of the circuit. Of course, the time delay to fire of the solid state switch may be adjusted by adjusting the position of the potentiometer tap. Thus, with a suitable time delay to fire of the solid state switch, it will remain unfired and the antenna shutoff relay de-activated with overload protective switching shutoff during normal tuning of the receiver even with repeated closing of the normally closed switch. However, it is to be recognized that as a newly tuned position is held beyond a time period imposed by the time constant of the circuit and the setting of the potentiometer tap, that the solid state switch will fire, the shutoff relay will be activated, and antenna shutoff removed, even though the antenna may be receiving excessively high and potentially harmful high powered signals.

A specific embodiment representing what is presently regarded as the best mode for carrying out the invention is illustrated in the accompanying drawing which represents an antenna and radio receiving system having a time delay antenna disconnect subject to actuation during tuning of the receiver.

Referring to the drawing:

The radio frequency receiving antenna 10 is connected for feeding an RF signal input through the relay control switch 11 to the tuning and filter circuit 12. The RF signal output of tuning circuit 12 is applied as an input to the following RF and IF stages in receiver circuitry 13.

Tuning knob 14 of tuning circuit 12 is drive connected, as indicated by drive line 15, for driving cam 16 whenever knob 14 is turned for tuning the receiver. Rotation of cam 16 actuates time delay overload antenna disconnect circuit 17 for opening switch 11 to provide overload protection by antenna shutoff during tuning. Switch 18 is of the single pole double throw type with the pole movable contact arm 19 resiliently deflectable from engagement with normally closed contact 20 to the deflected position, indicated in phantom, in contact with normally open contact 21. This alternate deflective movement betwen contacts 20 and 21 is accomplished with cam rises 22 passing into and out of contact with, and deflecting pole contact arm 19 in an out repeatedly during continued rotation of cam 16.

The pole contact arm 19 of switch 18 is connected to the negative side of a voltage supply 23 (shown as a battery, although it could be B+ voltage). The normally closed contact 20 of switch 18 is connected to the cathode 24 of a solid state PNPN type switch 25. The anode 26 of switch 25 is connected through the coil of relay 27 to the positive side of voltage supply 23. The gate electrode 28 of solid state switch 25 is connected to adjustable tap 29 of potentiometer 30. Potentiometer 30, in parallel with capacitor 31, and in series with resistor 32, is connected between the negative and positive sides of voltage supply 23. Furthermore, normally open contact 21 of switch 18 is connected to the common junction of resistor 30 and capacitor 31 with resistor 32, in order that any charge on capacitor 31 will be shorted out and removed whenever switch contact arm 19 contacts normally open contact 21.

Whenever contact arm 19 breaks contact with normally open contact 21, resumed current flow and the resulting IR voltage drop across potentiometer 30 effectively simultaneously charges capacitor 31 building up the voltage across potentiometer 30 at a rate determined by the time constant of the circuit. As the charge on capacitor 31 is increasing, the voltage imparted to potentiometer tap 29 rises and ultimately attains a predetermined voltage level effectively firing solid state switch 30. Of course, the movable contact arm 19 must have returned to engagement with normally closed contact 20 with solid state switch 25 positively biased anode 26 to relatively negative cathode 24 for firing with gate electrode 28 at firing potential. When switch 25 is fired, the coil of relay 27 is energized and switch 11 is moved from a normally open state to the closed state shown connecting the antenna 10 to feed an input to tuning circuit 12. Although the movable contact arm 19 shown is resiliently self biasing to engagement with normally closed contact 20 a resilient spring biased arm could be used in its place. A cam rise 22 usually does not immedately deflect movable contact arm 19 from normally closed contact 20 the instant that tuning and rotation of cam 16 is started. This is permissible, however, since the tuning knob may be rotated through a small angle before it becomes important that switch 11 be opened and overload protection provided while tuning.

The capacitor 31 charging time and the potentiometer 30 voltage build up time delay is such that adjustable movement of potentiometer tap 29 in a working system gave a possible time delay period adjustment range of from 0.5 to 2 second in attaining the potential on gate electrode 28 necessary to fire switch 25. In other words, when the voltage across capacitor 31 and across the potentiometer 30 reaches a preset value, the solid state switch 25 fires and relay coil 27 becomes energized. Thus, normally open switch 11 is closed and antenna 10 is connected to tuning circuit 12. Movable contact arm 19 is normally deflected back and forth between contacts 20 and 21 at such a rate that it does not remain in engagement with contact 20 for a long enough period of time during normal tuning for solid state switch 25 to become fired. This protective device enables an operator to skip high power signal frequencies, that he may, or may not, be aware of, without damage to filter and receiver components. However, this does not prevent the operator from tuning to a high power signal frequency which may be connected to the tuning circuit after the time delay to fire even though the signal input may be at damaging power levels.

The solid state switch 25 may be a silicon junction PNPN control switch, a three junction semiconductor device with thyratron like characteristics. Current in both directions through switch 25 is blocked until a low level threshold positive potential is applied to the gate electrode 28. In the on (fired) state there is very low forward direction impedance through switch 25 and gate electrode 28 has no control. The solid state PNPN switch 25 used has substantially zero anode to cathode current in the unfired state. This prevents undesired current flow through the coil of relay 27 that could give rise to relay switch bounce and sticking under vibration conditions. A properly selected trigistor, also a solid state device of the PNPN type, having suitable input to fire characteristics may be used in place of the silicon diffused junction PNPN controlled switch 25. Generally, any device that may be used as a solid state switch 25, should have substantially no leakage current and have low control electrode (gate or base, as the case may be) input to fire characteristics. It is possible in some applications that a transistor having suitably low leakage current characteristics could be utilized as the solid state switch 25.

Components used with a time delay antenna tuning disconnect circuit installed in a Collins Radio Company, 635R–1 Band-Pass Filter for radio frequency receivers include the following:

| | |
|---|---|
| Switch **18** | Single pole double throw switch with a normally closed contact and a normally open contact. |
| Voltage supply **23** | 28 volts. |
| Solid State Switch **25** | 3A61S of Solid State Products, Inc. |
| Relay **27** | A relay having a normally open contact. |
| Resistor **30** | 50K ohms. |
| Capacitor **31** | 150$\mu$f. @ 15 volts. |
| Resistor **32** | 180K ohms. |

Whereas this invention is here illustrated and described with respect to a specific embodiment thereof, it should be realized that various changes may be made without departing from the essential contribution to the art made by the teachings hereof.

I claim:

1. A tuning actuated time delay circuit shutoff relay system having: switch means movable between a normally closed contact and a normally open contact; tuning means; means connected to move with movement of said tuning means for alternately connecting said switch means to said normally closed contact and said normally open contact during tuning; a power supply connected to said switch means; a trigger device having a first electrode connected to the normally closed contact and having a second electrode connected through the coil of a relay to said power supply; electric circuit means connected to said power supply; said electric circuit means being of the type subject to a voltage buildup as determined by the time constant of the circuit when the circuit is connected across a voltage potential; said trigger device being provided with a third electrode; said third electrode having a voltage sensing connection to said circuit means; said circuit means being connected to said normally open contact and subject to voltage buildup recycling whenever said switch means breaks contact with said normally open contact; said coil being the activating coil of a relay provided with a relay actuated shutoff switch; said trigger device being subject to activation to a fired state after tuning has ceased with said switch means having returned to said normally closed contact, and with the potential of said voltage sensing connection and of the third electrode having risen to trigger firing potential, and wherein the means connected to move with movement of said tuning means is a cam, drive-connected to said tuning means; said cam means being positioned for alternately moving said switch means back and forth between said normally closed contact and said normally open contact during tuning; said electric circuit means including a resistor and a capacitor connected in parallel between one side of said power supply and a common junction; said common junction being connected to said normally open contact and through resistive means to the other side of said power supply; and said voltage sensing connection being a tap on said resistor connected in parallel to said capacitor.

2. The tuning actuated time delay circuit shutoff relay system of claim 1, wherein said trigger device is a solid state switch having three electrode connections.

3. The tuning actuated time delay circuit shutoff relay system of claim 2, wherein said solid state switch is a PNPN type switch with said three electrode connections being a cathode, an anode, and a gate.

4. The tuning actuated time delay circuit shutoff relay system of claim 2, wherein said solid state device is a silicon three junction semiconductor PNPN control switch with thyratron like characteristics.

5. An antenna to radio tuning circuit tuning actuated disconnect system having time delay reconnect characteristics, including: an antenna, a tuning circuit, a line between the antenna and the tuning circuit, and tuning means for the tuning circuit; switch means having a normally closed contact and a normally open contact; means activated by motion of said tuning means for moving said switch means back and fourth between said normally closed contact and said normally open contact; solid state switch trigger means; a relay having a relay switch in the line between the antenna and the tuning circuit; a power supply; a first power circuit loop with said switch means connected to one side of said power supply, the normally closed contact connected to a first electrode of said solid state switch, and a second electrode of said solid state switch connected through the coil of said relay to the other side of said power supply; a second power circuit loop including a first resistor and a capacitor connected in parallel between one side of said power supply and a common junction, with said common junction connected both to said open contact and through a second resistor to the other side of said power supply; said first resistor being provided with a tap connection; and said tap being connected to a third electrode of said solid state switch.

6. The antenna to tuning circuit disconnect system of claim 5, wherein said first resistor is a potentiometer, and said tap connection is an adjustable tap of said potentiometer.

7. The antenna to tuning circuit disconnect system of claim 5, wherein said switch means is resiliently biased to engagement with the normally closed contact.

References Cited by the Examiner

UNITED STATES PATENTS

| | | | |
|---|---|---|---|
| Re. 18,972 | 10/33 | Leib | 325—456 |
| 2,767,309 | 10/56 | Schaner | 325—362 |
| 3,060,381 | 10/62 | Turner et al. | 325—362 |

DAVID G. REDINBAUGH, *Primary Examiner.*

STEPHEN W. CAPELLI, *Examiner.*